J. O. WILSON.
PERMUTATION LOCK.
APPLICATION FILED OCT. 26, 1920.
1,422,645.
Patented July 11, 1922.
4 SHEETS—SHEET 4.
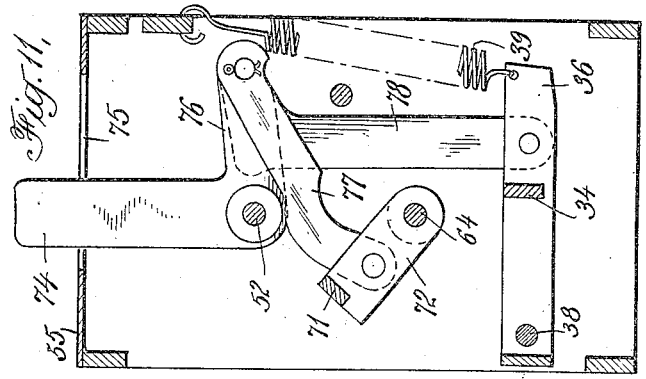
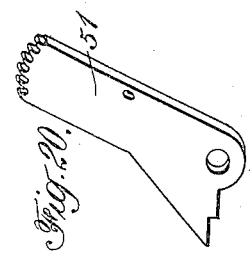
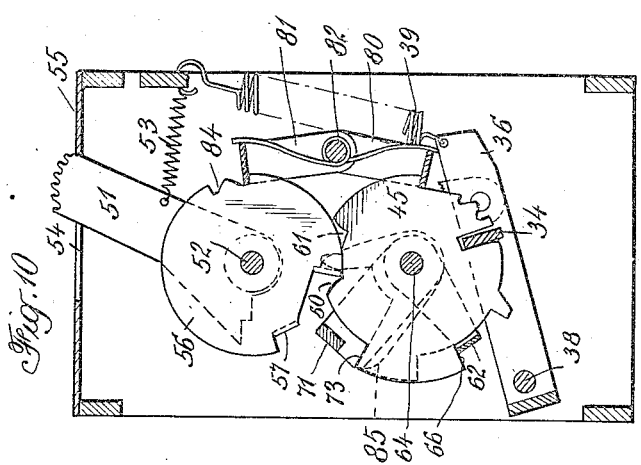
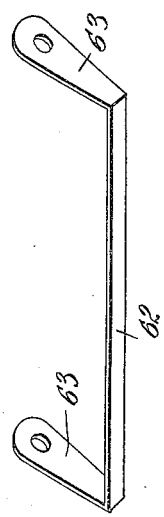
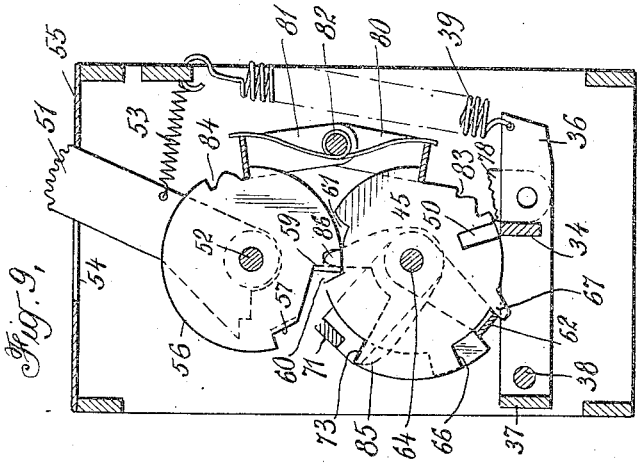
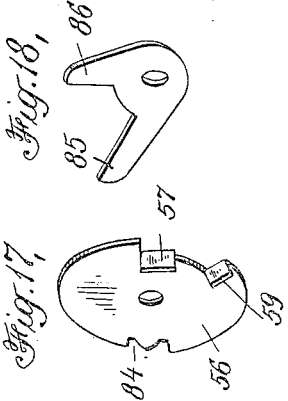
Inventor
James O. Wilson
By Attorney
E. W. Marshall

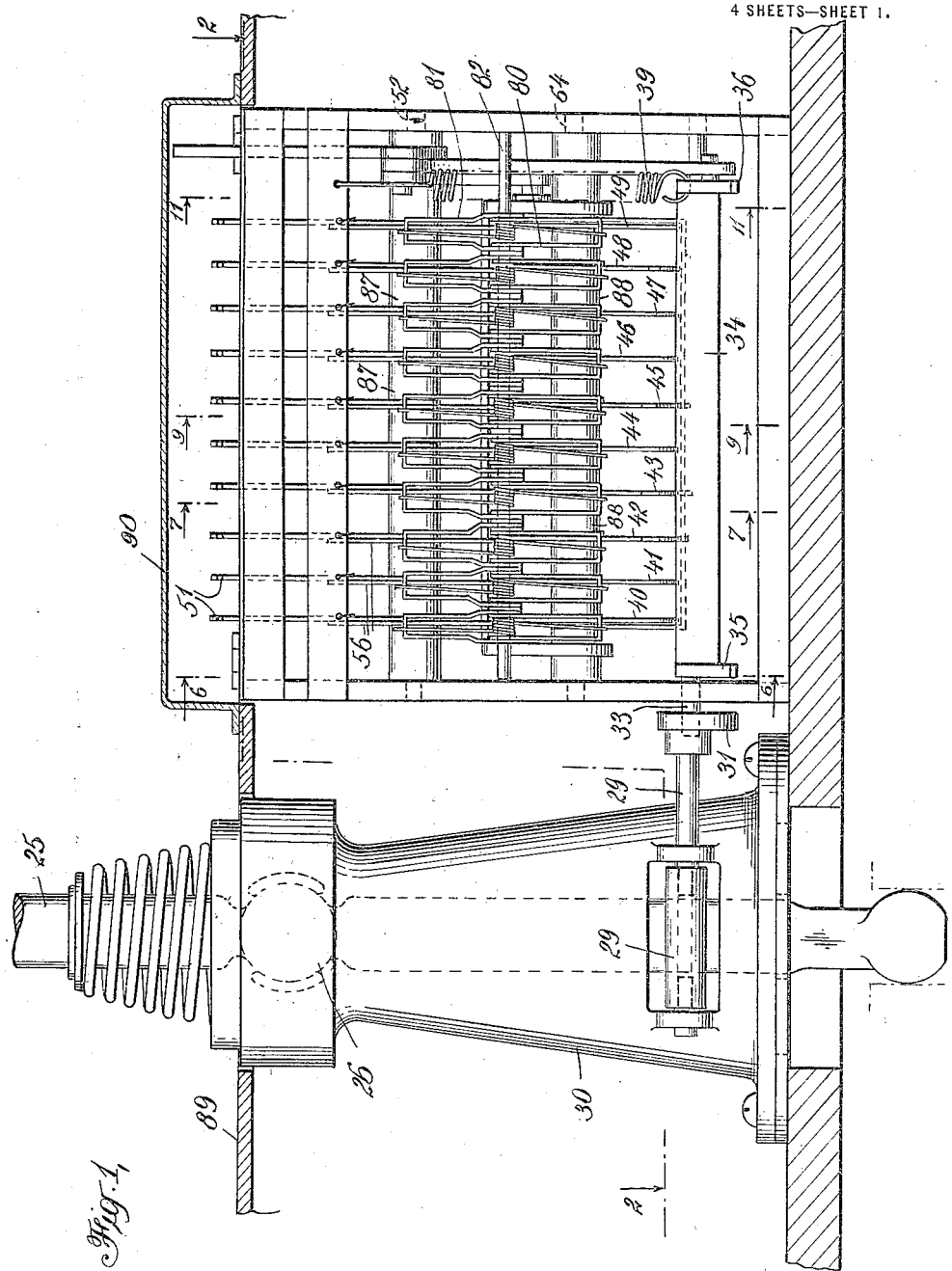

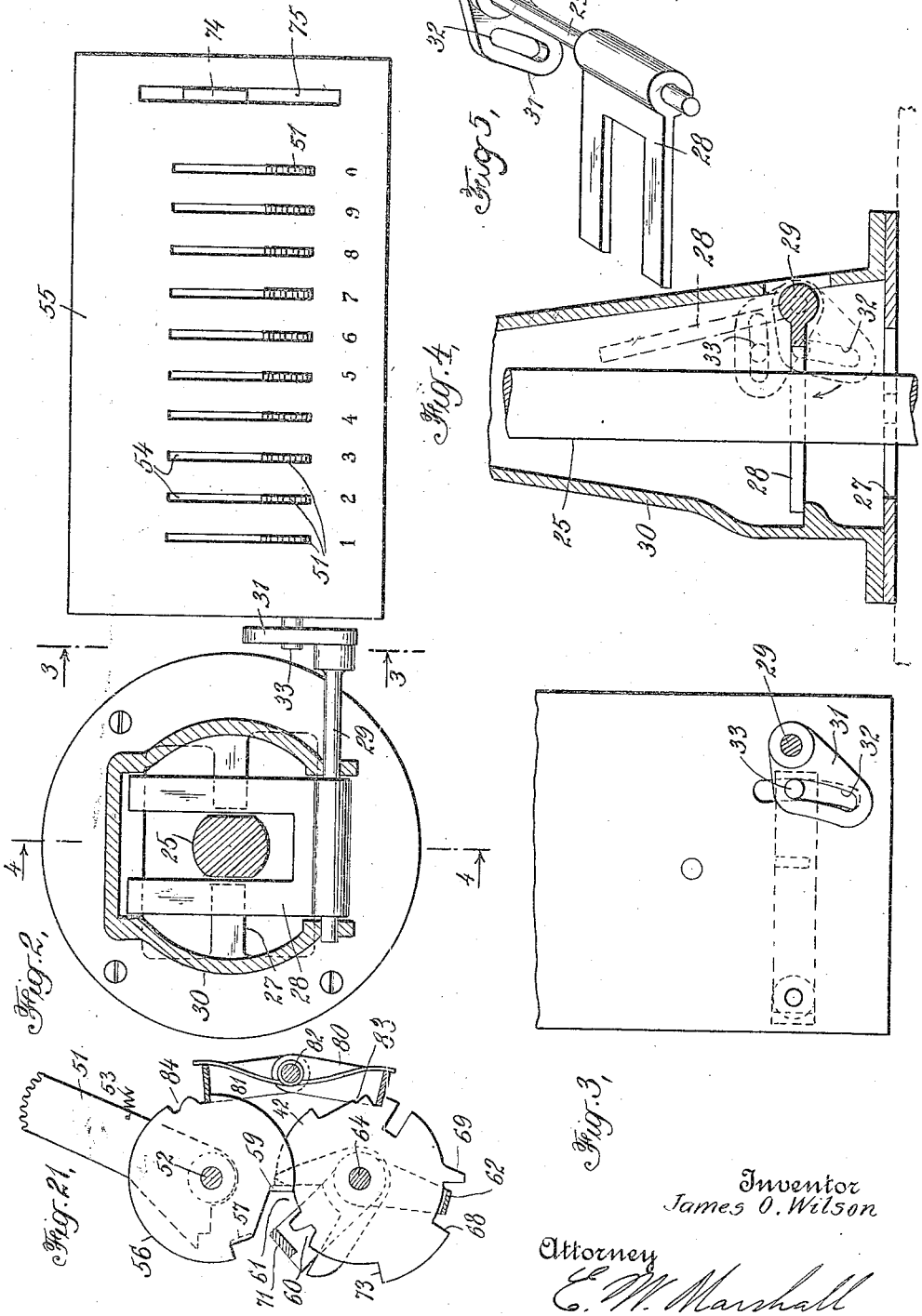

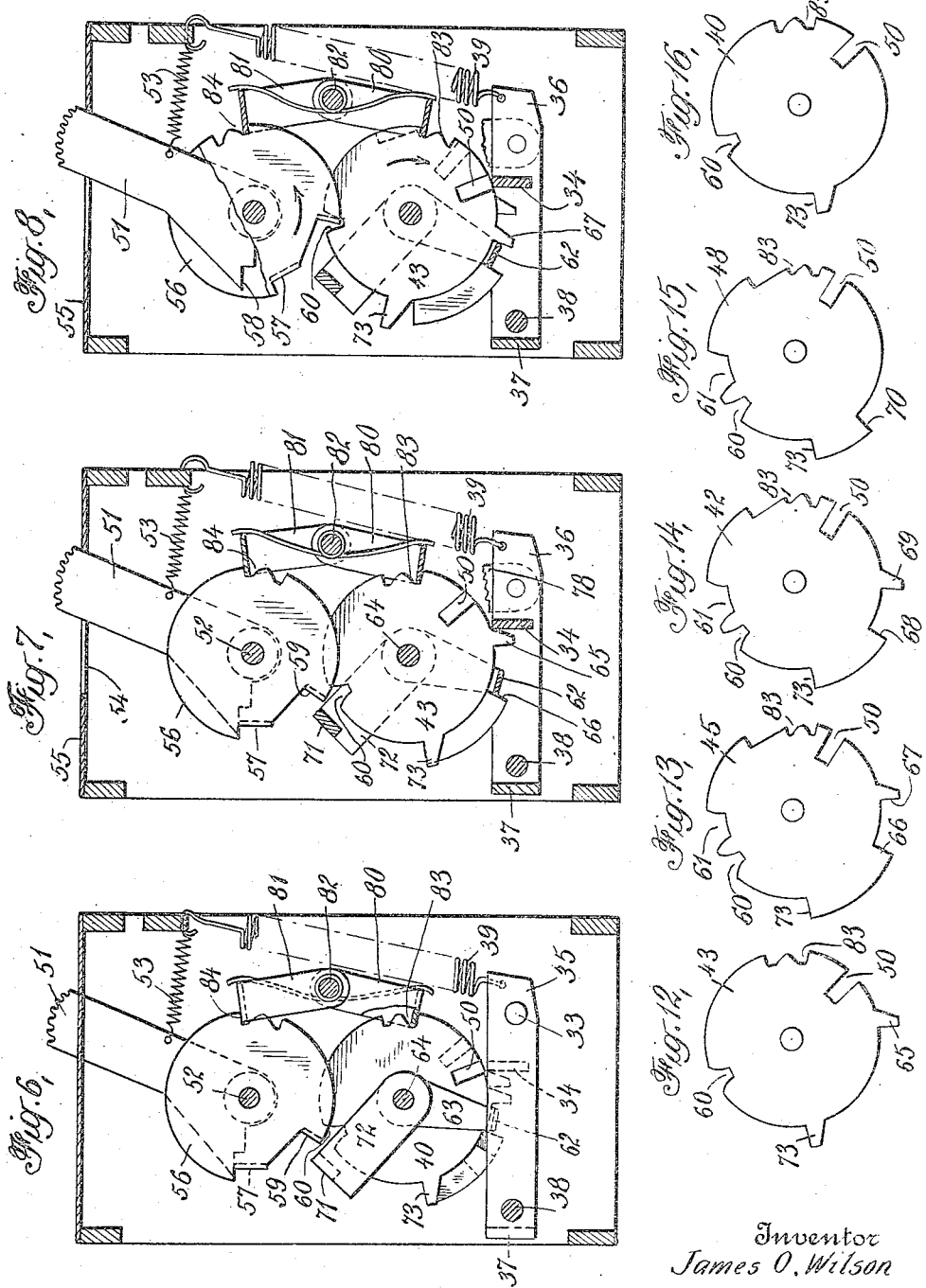

UNITED STATES PATENT OFFICE.

JAMES O. WILSON, OF JERSEY CITY, NEW JERSEY.

PERMUTATION LOCK.

1,422,645.  Specification of Letters Patent.  Patented July 11, 1922.

Application filed October 26, 1920. Serial No. 419,619.

*To all whom it may concern:*

Be it known that I, JAMES O. WILSON, a citizen of the United States, and a resident of Jersey City, Hudson County, and State of New Jersey, have invented certain new and useful Improvements in Permutation Locks, of which the following is a specification.

My present invention relates to locks of the so-called "permutation" type, and the objects of the invention are to provide a practical and relatively inexpensive lock of this character which will be of simple and rugged construction and which will be useful for a great variety of purposes.

A special object of the invention is to provide a device of the character set forth which will be particularly adapted for use as an automobile lock.

In the accompanying drawings I have illustrated the lock as applied and in use for securing the gear shift lever of an automobile, but wish it understood that the lock may be used for other purposes, and also that various structural changes may be made in the lock without departure from the true spirit and scope of the invention as hereinafter defined and claimed.

In the drawings referred to:

Figure 1 is a side elevation of the lock mechanism, with the cover of the lock and certain other parts illustrated in section.

Figure 2 is a sectional and plan view, taken on substantially the plane of line 2—2 of Figure 1.

Figure 3 is a broken and transverse sectional view at the end of the lock case, taken on substantially the plane of line 3—3 of Figure 2, and showing particularly the connection between the locking bolt and the yoke which secures the gear shift lever.

Figure 4 is a vertical sectional view, taken on substantially the plane of line 4—4 of Figure 2, and illustrating particularly the operation of the locking yoke.

Figure 5 is a detached perspective view of the locking yoke.

Figure 6 is a vertical sectional view of the lock taken on a transverse plane corresponding substantially to the plane of line 6—6 of Figure 1.

Figure 7 is a corresponding view, taken on substantially the plane of line 7—7 Figure 1, and illustrating one of the so-called "master" tumblers.

Figure 8 is another view of the same parts showing the tumbler as having been turned to bring the slot therein into register with the bolt or locking bar.

Figures 9 and 10 are views similar to Figures 7 and 8, illustrating the action of one of the other master tumblers, these views being taken on substantially the plane of line 9—9 of Figure 1.

Figure 11 is a sectional view, taken on substantially the plane of line 11—11 of Figure 1 and showing the operating lever and parts actuated thereby.

Figures 12, 13, 14 and 15 are detail plan views of the four master discs or tumblers employed in the lock illustrated.

Figure 16 is a similar view of one of the blank or idler tumblers.

Figure 17 is a detached perspective view of one of the actuating discs for the tumblers.

Figure 18 is a detached perspective view of one of the restoring dogs.

Figure 19 is a similar view of the tumbler setting lever of bar.

Figure 20 is a perspective view of one of the finger or key levers, and Fig. 21 is a detail of the second master tumbler.

The part to be locked, the gear shift lever in the present disclosure, is indicated at 25, said lever being shown as pivoted at 26 and as passing through an H guide 2 at its lower end into the gear box. This lever is locked in its neutral position by a locking yoke 28 forked to embrace the lower end portion of the lever, said yoke being carried by a shaft 29 journaled in the side of the hollow post or column 30 which supports the gear shift lever. The yoke carrying shaft 29 is, in the present instance, directly connected with the bolt of the lock through the provision of a rocker arm 31 on the extended end of said shaft, and which has an angularly arranged slot 32 therein to receive a stud or pin 33 projecting from the end of the locking bolt.

The locking bolt or bar is designated 34 and is shown in the form of a flat bar extending between the arms 35, 36 of a yoke shaped member 37 which is pivotally supported by means of a rod 38. The arm 35 of this yoke carries the stud 33 which connects with the rock arm of the locking yoke, and a spring 39 is shown connected with the other arm 36 for drawing the bolt up against the edges of the tumblers.

In the lock illustrated there are ten tumbler discs, designated in Figure 1, 40 to 49. Of these, discs 43, 45, 42 and 48 are the so-called "master" discs, the balance being simply plain locking discs and having no inter-connection or inter-related action. As these so-called idler discs may be all alike, I have shown only one of them in detail, Figure 16. All the discs are alike in that they are each provided with a substantially radial slot 50, to receive the bolt or locking bar, from which it will be seen that the bolt cannot be thrown by its spring to release the gear shift lever or other device until the tumblers have been turned to bring all the slots into register, as in the case illustrated in Figure 10.

The finger or key levers by which the combination is operated, may all be alike and for that reason I have designated them all by the single reference character 51. These levers are pivoted on a supporting shaft 52 and are held normally in the position shown in Figure 2 by springs 53 connected with the individual levers. The key levers are guided, and the length of their stroke is governed, in the illustration, by causing them to work in the guide slots 54 provided in the top or cover 55 of the lock, through which the ends of the levers project. Numbers or other reference characters may be provided on the cover plate adjacent the key lever slots, as I have shown in Figure 2.

The motion of the key levers is transmitted to the tumblers by means of the intermediate discs or actuators 56 pivoted on the supporting rod 52 at the sides of the key levers and each having an angularly extending lug 57 projecting beneath the toe or point 58 of one of the key levers, and a second angularly projecting lug 59 to engage in a notch 60 in the tumbler with which it cooperates.

In addition to the notches 60, the master tumblers 45, 42 and 48 are provided with notches 61 in rear of the actuating notches 60. These extra notches constitute a part of the interlocking feature which requires that the key levers of the combination be operated in a certain definite order.

The other part of the interlocking feature is provided by a yoke shaped shift bar 62 extending across the tumblers and having substantially parallel arms 63 pivotally engaged on the tumbler shaft 64. This shift bar stands in front of a lug 65 on the first master tumbler 43 and in behind a shoulder 66 on the second master tumbler 45, so that when the first master tumbler is turned to bring its slot 50 into line with the bolt 34, said shift bar will operate to turn the second master tumbler 45 far enough to bring the slot 60 therein into position for engagement by the lug 59 of the actuating disc 56 which operates the second master tumbler.

In similar fashion the second master tumbler 45 is provided with a lug 67 standing behind the shift bar so that when the second master tumbler is turned by its key lever to bring its slot 50 into register with the bolt, said shift bar will be advanced and will by engagement with the shoulder 68 on the third master tumbler turn said third tumbler far enough to bring the slot 60 therein into position to be engaged and operated by the actuating disc 56 provided therefor.

The third locking tumbler likewise is provided with a lug 69 standing in back of the shift bar so as to advance the shift lever another step when the third master tumbler is turned by its key lever, said shift bar in this action engaging a shoulder 70 on the fourth master disc to turn the same far enough to bring the slot 60 therein into position for engagement by the lug 59 on its actuating disc 56.

It will thus be apparent that the master tumblers can be operated to release the lock only in a certain definite combination, because each of these tumblers is dependent for its operation upon the prior operation of the preceding master tumbler; the first master tumbler through the shift bar setting the second master tumbler in position to be engaged and operated by its actuating disc, the second positioning the third and similarly, the third positioning the fourth. If this order of operation is departed from, it will be seen that the tumblers will not be positioned so that the actuating discs can engage and operate the same.

While the master tumblers control the operation of the lock, it will be apparent that the other or extra tumblers also control the lock in that they must all be so positioned that the slots 50 thereof register with the locking bar or bolt 34 (Figure 10).

The tumblers are all simultaneously "set" or restored to a preliminary or normal position by a yoke shaped clearing bar 71 having arms 72 pivotally engaged on the tumbler shaft 64, said clearing bar overstanding the restoring shoulders 73 provided alike on the master and extra tumblers and operating when turned in a left handed direction in Figures 6 to 11, to rotate the extra tumblers 40 so as to bring the slots 50 therein into register with the locking bolt 34 (Figure 6) and so as to carry the slots in the master tumblers out of register with the locking bolt, as indicated in Figure 7. In other words, this clearing bar operates to set all the extra tumblers in the release position and to set the master tumblers in a locking position, but in condition to be operated in the proper sequence demanded by the combination of the particular lock.

The clearing bar is actuated by an operating lever 74 projecting up through a slot 75 in the top of the lock and having an angular arm 76 connected by a pivoted link 77 with one of the arms 72 which support the clearing bar (Figure 11).

This same operating lever also serves to shift the locking bolt or bar 34 clear of the slots in the tumblers and this by means of a pivoted link connection 78 between the angular arm 76 of said lever and the arm 36 supporting one end of the locking bolt. The spring 39 connected with the arm 36 serves normally to hold the parts just described in the relation shown in Figure 11, with the locking bolt in engagement with the rims of the tumblers.

The tumblers and the actuating discs therefor are yieldingly retained in the positions to which they are turned either by the key levers or by the clearing bar by the spring-pressed retaining levers 80 and 81 pivotally supported on the rod 82 and engaging in the notches 83, 84 provided in the tumblers and in the actuating discs respectively.

To set the lock in the securing position, the operating lever 74 is simply pressed to the right in Figure 11. This lowers the bolt out of the notches in the tumblers and causes the clearing bar to rotate the tumblers so as to set the extra tumblers with the notches in line with the clearing bar and the master tumblers with their locking notches 50 out of register with the bolt, and with their extra notches 61 in line with the lugs 59 of the actuating discs 56. When the pressure on the lever is released, the parts will be returned by the spring 39 to the position shown in Figure 11, the bolt being then held in its depressed position by the four master tumblers. The depression of the locking bolt performs the further operation in the present disclosure, of dropping the locking yoke 28 down into holding engagement over the shank of the gear shift lever, as indicated in Figures 2 and 4. The gear shift lever is thus locked and it cannot be operated to throw the gears into mesh until the master tumblers have been operated in their proper order to release the bolt.

In the lock illustrated, the key levers shown in Figure 2 must be operated in the combination 4, 6, 3, 9 to release the lock. The operation of the first of these key levers, that numbered 4, through the actuating disc 56 turns the first master disc 43 so as to bring the locking slot therein into register with the locking bolt, as shown in Figure 8, at the same time causing the shift bar 62 to advance the second master tumbler 45 far enough to carry the extra notch 61 therein out of register with the actuating lug 59 on the disc 56, and the true operating notch 60 into register with the lug 59, as indicated in Figure 21. This enables the second key lever of the combination, number 6, through the actuating disc 56, to pick up the second master tumbler and turn the same into the position indicated in Figure 9, with the locking slot 50 in register with the bolt.

This operation of the second master tumbler through the shift bar sets the third master tumbler 42 into position for the true actuating notch 60 therein to be engaged by the lug 59 on the actuating disc so that when the third key lever of the combination, number 3, is operated, the third master tumbler will be rotated far enough to bring its locking slot into register with the bolt. This third operation, it will be understood, through the shift bar turns the fourth master tumbler so as to carry the false or inoperative notch 61 therein out of register with the lug 59 of the actuating disc and the true operating notch 60 into register with said lug so that when the fourth key lever of the combination, number 9, is actuated, the fourth master tumbler 48 will be turned to bring its locking slot into register with the bolt. When all four of the master tumblers have been thus turned to bring their locking notches into register with the bolt, the spring 39 will snap the bolt into the registered slots, this lifting motion of the bolt through the connections described throwing the locking fork 28 upward into the dotted line position shown in Figure 4, and thereby freeing the gear shift lever.

It will be evident that to effect the unlocking operation described, the key levers of the master tumblers must be operated in the order stated, and that any deviation from this order will result in the lock remaining in its locked condition. Also it will be clear that the operation of any other than the key levers of the master tumblers will prevent the release of the lock, since such operation of the other key levers will result in throwing the extra tumblers into position with their locking slots out of register with the bolt so that even if the combination be properly operated, the lock will not be released if one of these extra key levers has been turned. Therefore, before working the combination, the operating lever must be thrown so as to cause the clearing bar to throw all the extra tumblers into the neutral position, and the master tumblers in their pre-arranged initial position. The operation of the master key levers in the special combination determined upon will then effect the release of the lock. The slot 32 in the rock arm 31 of the locking yoke permits this clearing stroke of the operating lever without affecting the condition of the locking yoke, as will be clear from Figure 3.

When released, the lock will stand with the parts in the position indicated in Figure 10 until such time as the operating lever is again turned as described, to lower the locking bolt and reset the tumblers.

A special feature in the resetting operation is that the actuating discs for the master tumblers are turned back, or reset by means of restoring dogs pivoted on the tumbler shaft at the side of the master tumblers, said dogs being in the nature of bellcranks as shown in detail in Figure 18, having angularly arranged arms 85 and 86 adapted the first to be engaged by the clearing bar and the latter to engage the lugs 59 of the actuating discs 56. These arms of the dogs are so angularly related as to turn back the master tumblers on the restoring or resetting stroke far enough to bring the false or inoperative notches 61 in such tumblers into register with the actuating lugs 59, which, of course, insures that the tumblers be operated step by step in the pre-arranged order.

The lock, it will be seen, is of rugged construction and relatively simple considering the results accomplished. Furthermore, the parts are of such a nature that they may be constructed to a large extent of sheet metal, which means simplicity of manufacture and relatively low cost.

The cooperating actuators and tumblers may be positioned in proper relation on the supporting shafts 52 and 64 in any suitable way, and in the present disclosure I have shown the same so supported by means of spacing washers or bushings 87 and 88 on the shafts 52 and 64 respectively between the adjoining actuators and tumblers. When applied to an automobile gear lock, as illustrated, the lock mechanism will for the most part be positioned below the floor line, which is indicated at 89, only the key levers and operating lever being exposed and these, when not in use, being normally protected by a suitable hinged or removable cover 90 (Figure 1).

It will be apparent that the combination of the lock may be changed at any time by simply altering the positions of the master tumblers. Thus, a single lock construction may be made to operate under a great multitude of different combinations.

What I claim is:

1. In a lock of the character described, a bolt, locking tumblers therefor, connecting means between said tumblers operative to bring the tumblers to a predetermined position when the tumblers are actuated in a pre-arranged order, and actuating devices for the respective tumblers.

2. In a lock of the character described, a bolt, locking tumblers therefor, connecting means between said tumblers operative to bring the tumblers to a predetermined position when the tumblers are actuated in a pre-arranged order, and actuating devices for the respective tumblers, said actuating devices having operative connection with the tumblers when the same are operated in the pre-arranged order.

3. In a lock of the character described, a bolt, locking tumblers therefor, connecting means between said tumblers operative to bring the tumblers to a predetermined position when the tumblers are actuated in a predetermined order, actuating devices for the respective tumblers, shift mechanism, and a holder for the same under control of the bolt.

4. In a lock of the character described, a bolt, locking tumblers therefor, connecting means between said tumblers operative to bring the tumblers to a predetermined position when the tumblers are actuated in a predetermined order, actuating devices for the respective tumblers, shift mechanism, and a holder for the same under control of the bolt, said bolt being connected with said holding device through a lost motion connection enabling movement of the bolt without releasing the holding device.

5. In a lock of the character described, a bolt, locking tumblers therefor, connecting means between said tumblers operative to bring the tumblers to a predetermined position when the tumblers are actuated in a predetermined order, actuating devices for the respective tumblers, shift mechanism, a holder for the same under control of the bolt, said bolt being connected with said holding device through a lost motion connection enabling movement of the bolt without releasing the holding device, and restoring mechanism operative in said last-mentioned movement of the bolt.

6. In a lock of the character described, a plurality of rotatably arranged tumblers, a bolt controlled thereby, rotatable actuators for said tumblers, oscillating key levers for turning the actuators, and inter-connecting means between certain of the tumblers for advancing the tumblers in pre-arranged order.

7. In a lock of the character described, a plurality of rotatably arranged tumblers, a bolt controlled thereby, rotatable actuators for said tumblers, oscillating key levers for turning the actuators, inter-connecting means between certain of the tumblers for advancing the tumblers in pre-arranged order, and connections between the tumblers and actuators operable when the tumblers have been advanced in said pre-arranged order.

8. In a lock of the character described, a plurality of rotatably arranged tumblers, a bolt controlled thereby, rotatable actuators for said tumblers, oscillating key levers for turning the actuators, inter-connecting means between certain of the tumblers for advancing the tumblers in pre-arranged order, connections between the tumblers and actuators operable when the tumblers have been advanced in said pre-arranged order, and means for yieldingly retaining the tumblers and actuators in the position to which they are turned.

9. In a lock of the character described, a plurality of rotatably arranged tumblers, a bolt controlled thereby, rotatable actuators for said tumblers, oscillating key levers for turning the actuators, inter-connecting means between certain of the tumblers for advancing the tumblers in pre-arranged order, connections between the tumblers and actuators operable when the tumblers have been advanced in said pre-arranged order, and clearing means for simultaneously returning all the tumblers and actuators to a predetermined initial position.

10. In a lock of the character described, a plurality of rotatably arranged tumblers, a bolt controlled thereby, rotatable actuators for said tumblers, oscillating key levers for turning the actuators, inter-connecting means between certain of the tumblers for advancing the tumblers in pre-arranged order, connections between the tumblers and actuators operable when the tumblers have been advanced in said pre-arranged order, and clearing means for simultaneously returning all the tumblers and actuators to a predetermined initial position and with certain of the tumblers inactive and others actively associated with the bolt.

11. In a lock of the character described, pivoted key levers, actuating members operable thereby, tumblers, said tumblers and actuating members having variable connections, means operable by the tumblers for establishing said connections in a pre-arranged order when the key levers are actuated in the predetermined combination, and a bolt under control of the tumblers.

12. In a lock of the character described, pivoted key levers, actuating members operable thereby, tumblers, said tumblers and actuating members having variable connections, means operable by the tumblers for establishing said connections in a pre-arranged order when the key levers are actuated in the predetermined combination, including a shift bar extending across and operably engaged by certain of the tumblers, and a bolt under control of the tumblers.

13. In a lock of the character described, a supporting shaft, tumblers journaled on said shaft, a bolt controlled by said tumblers, a clearing bar journaled on said shaft and arranged to engage the tumblers to set the same in a predetermined relation, a shift bar journaled on the shaft and engaged by certain tumblers as the same are operated to advance certain other tumblers, and means for rotating the respective tumblers.

14. In a lock of the character described, a supporting shaft, tumblers journaled on said shaft, a bolt controlled by said tumblers, a clearing bar journaled on said shaft and arranged to engage the tumblers to set the same in a predetermined relation, a shift bar journaled on the shaft and engaged by certain tumblers as the same are operated to advance certain other tumblers, means for rotating the respective tumblers, and including key levers and actuators operated thereby, said actuators having variable connections with the tumblers.

15. In a lock of the character described, a supporting shaft, tumblers journaled on said shaft, a bolt controlled by said tumblers, a clearing bar journaled on said shaft and arranged to engage the tumblers to set the same in a predetermined relation, a shift bar journaled on the shaft and engaged by certain tumblers as the same are operated to advance certain other tumblers, means for rotating the respective tumblers, and including key levers and actuators operated thereby, said actuators having variable connections with the tumblers, said connections being operative to turn the tumblers to the proper position only when the shift bar has been operated to set the tumblers in a predetermined order.

16. In a lock of the character described, a supporting shaft, key levers pivoted on said shaft, actuating discs journaled on said shaft and arranged to be turned by the key levers, tumblers journaled in line with the actuators, said tumblers and actuators having interfitting lugs and slots for the transmission of motion from the actuators to the tumblers, and a bolt controlled by the tumblers.

17. In a lock of the character described, a supporting shaft, key levers pivoted on said shaft, actuating discs journaled on said shaft and arranged to be turned by the key levers, tumblers journaled in line with the actuators, said tumblers and actuators having interfitting lugs and slots for the transmission of motion from the actuators to the tumblers, a bolt controlled by the tumblers, and a positioning device engaged by certain of the tumblers when the same are operated in a pre-arranged order to advance certain other tumblers into position to engage the connections between the tumblers and actuators.

18. In a lock of the character described, a supporting shaft, key levers pivoted on said shaft, actuating discs journaled on said shaft and arranged to be turned by the key levers, tumblers journaled in line with the actuators, said tumblers and actuators having interfitting lugs and slots for the transmission of motion from the actuators to the tumblers, a bolt controlled by the tumblers, a positioning device engaged by certain of the tumblers when the same are operated in a pre-arranged order to advance certain other tumblers into position to engage the connections between the tumblers and actuators, and restoring devices for restoring the connections between the tumblers and actuators to a predetermined initial relation.

19. In a lock of the character described, a supporting shaft, key levers pivoted on said shaft, actuating discs journaled on said shaft and arranged to be turned by the key levers, tumblers journaled in line with the actuators, said tumblers and actuators having interfitting lugs and slots for the transmission of motion from the actuators to the tumblers, a bolt controlled by the tumblers, a positioning device engaged by certain of the tumblers when the same are operated in a pre-arranged order to advance certain other tumblers into position to engage the connections between the tumblers and actuators, and restoring dogs for returning the actuators to a predetermined initial relation.

20. In a lock of the character described, a supporting shaft, key levers pivoted on said shaft, actuating discs journaled on said shaft and arranged to be turned by the key levers, tumblers journaled in line with the actuators, said tumblers and actuators having interfitting lugs and slots for the transmission of motion from the actuators to the tumblers, a bolt controlled by the tumblers, a positioning device engaged by certain of the tumblers when the same are operated in a pre-arranged order to advance certain other tumblers into position to engage the connections between the tumblers and actuators, restoring dogs for returning the actuators to a predetermined initial relation, and a clearing bar arranged to engage said restoring dogs and the tumblers to return the tumblers and actuators to a predetermined relation.

21. In a lock of the character described, a supporting shaft, tumblers journaled on said shaft, a bolt controlled by said tumblers, dogs journaled on the shaft at the side of the tumblers, a clearing bar for returning the tumblers and the dogs to a predetermined relation, actuators having variable connections with the tumblers and arranged for engagement by said restoring dogs.

22. In a lock of the character described, rotatable tumblers, a bolt controlled thereby, said tumblers having two sets of notches therein, actuators engageable with either set of notches, and a shifting bar actuated by certain of the tumblers and arranged to position certain other of the tumblers in position to have certain of the notches therein engaged by the actuators.

23. In a lock of the character described, rotatable tumblers each having an active and an inactive notch, actuators having lugs to engage in either of said notches and interconnecting means between the tumblers arranged when the tumblers are operated in a predetermined order to bring the active notches of the tumblers into register with the lugs on the actuators.

24. In a lock of the character described, rotatable tumblers each having an active and an inactive notch, actuators having lugs to engage in either of said notches, interconnecting means between the tumblers arranged when the tumblers are operated in a predetermined order to bring the active notches of the tumblers into register with the lugs on the actuators, pivoted key levers, and one-way connections between said key levers and the actuators.

25. In a lock of the character described, tumblers, a bolt controlled thereby and comprising a swinging yoke carrying a bar for engagement with the tumblers, means for swinging the yoke away from the tumblers, and a clearing bar operable in said swinging movement of the yoke to restore the tumblers to a predetermined relation.

26. In a lock of the character described, tumblers, a bolt controlled thereby and comprising a pivoted yoke carrying a bar for engagement with the tumblers, a finger lever, a connection from the finger lever to the yoke, and a spring for holding the yoke and finger lever in a predetermined relation.

27. In a lock of the character described, tumblers, a bolt controlled thereby and comprising a pivoted yoke carrying a bar for engagement with the tumblers, a finger lever, a connection from the finger lever to the yoke, a spring for holding the yoke and finger lever in a predetermined relation, a clearing bar for restoring the tumblers to a predetermined order, and a link connection from the finger lever to said clearing bar.

28. In a lock of the character described, a bell-crank lever, a spring-pressed bolt arranged to be shifted thereby, tumblers controlling the position of said bolt, a clearing bar for said tumblers, and a connection from the bellcrank to said clearing bar.

29. In a lock of the character described, a supporting shaft, tumblers journaled on said shaft, a bolt controlled by said tumblers, a shift bar journaled on the shaft and arranged to be advanced by certain of the tumblers to shift certain other of the tumblers, a clearing bar journaled on the shaft, means for rotating said clearing bar to restore the tumblers to a predetermined relation, a second supporting shaft, actuators journaled on said shaft, variable connections between said actuators and tumblers, restoring dogs journaled on the first supporting shaft and adapted to be operated by the clearing bar to restore the variable connections between the actuators and tumblers to a predetermined relation, and key levers pivoted on the second supporting shaft and arranged to operate the actuators.

30. In a lock of the character described, a supporting shaft, tumblers journaled on said shaft, a bolt controlled by said tumblers, a shift bar journaled on the shaft and arranged to be advanced by certain of the tumblers to shift certain other of the tumblers, a clearing bar journaled on the shaft, means for rotating said clearing bar to restore the tumblers to a predetermined relation, a second supporting shaft, actuators journaled on said shaft, variable connections between said actuators and tumblers, restoring dogs journaled on the first supporting shaft and adapted to be operated by the clearing bar to restore the variable connections between the actuators and tumblers to a predetermined relation, key levers pivoted on the second supporting shaft and arranged to operate the actuators, a hand lever, a connection from the hand lever for shifting the bolt, and a connection from the hand lever for operating the clearing bar.

31. In a lock of the charatcer described, a supporting shaft, tumblers journaled on said shaft, a bolt controlled by said tumblers, a shift bar journaled on the shaft and arranged to be advanced by certain of the tumblers to shift certain other of the tumblers, a clearing bar journaled on the shaft, means for rotating said clearing bar to restore the tumblers to a predetermined relation, a second supporting shaft, actuators journaled on said shaft, variable connections between said actuators and tumblers, restoring dogs journaled on the first supporting shaft and adapted to be operated by the clearing bar to restore the variable connections between the actuators and tumblers to a predetermined relation, key levers pivoted on the second supporting shaft and arranged to operate the actuators, a hand lever, a connection from the hand lever for shifting the bolt, a connection from the hand lever for operating the clearing bar, and spring-pressed dogs for retaining the tumblers and actuators in the positions to which they are shifted.

In witness whereof, I have hereunto set my hand this 23rd day of October, 1920.

JAMES O. WILSON.